United States Patent [19]

Liao

[11] Patent Number: 5,222,206
[45] Date of Patent: Jun. 22, 1993

[54] IMAGE COLOR MODIFICATION IN A COMPUTER-AIDED DESIGN SYSTEM

[75] Inventor: Ho-Long Liao, Rockford, Mich.

[73] Assignee: Computer Design, Inc., Grand Rapids, Mich.

[21] Appl. No.: 749,506

[22] Filed: Aug. 16, 1991

Related U.S. Application Data

[63] Continuation of Ser. No. 363,205, Jun. 8, 1989, abandoned.

[51] Int. Cl.⁵ .............................................. G06F 3/153
[52] U.S. Cl. .................................. 395/131; 395/129; 340/703; 340/747
[58] Field of Search ........................ 364/518, 521, 522; 340/703, 747, 750; 395/129, 131

[56] References Cited

U.S. PATENT DOCUMENTS

| | | | |
|---|---|---|---|
| 3,693,168 | 9/1972 | Halkyard et al. | 340/172.5 |
| 4,817,172 | 3/1989 | Cho | 382/21 |
| 4,835,526 | 5/1989 | Ishii et al. | 340/703 |
| 4,878,181 | 10/1989 | McKenna et al. | 364/518 |
| 4,935,879 | 6/1990 | Ueda | 364/522 |

OTHER PUBLICATIONS

Commonly-Assigned Copending U.S. patent application No. 359,118, filed May 31, 1989 by Ho-Long Liao & Edward Falk for Image Color Correction System & Method.

Foley, J. D., Van Dam, A. "Fundamentals of Interactive Computer Graphics" (pp. 611-616, Addison-Wesley, 1982).

"Tint Fill", Reprinted from Siggraph—1979, by Alvy Ray Smith, Computer Graphics Lab (pp. 276-283).

*Primary Examiner*—Phu K. Nguyen
*Attorney, Agent, or Firm*—Price, Heneveld, Cooper, DeWitt & Litton

[57] ABSTRACT

A method and system for alternatingly applying different colors to a realistic computer generated graphic image while preserving the effects of shading, highlights, reflectors and other lighting effects. A user selects a "New Color" to apply to an image and picks an "Original Color" from the image in an area not subject to extreme lighting effects. The difference between the parameters of these two colors in (H,S,V) coordinates is determined and applied to every pixel in a segment of the image to calculate a replacement pixel color. Tools are provided to allow the user to divide an image into segments to which color modification can be individually applied.

24 Claims, 6 Drawing Sheets

IMAGE COLOR MODIFICATION IN A COMPUTER-AIDED DESIGN SYSTEM

This is a continuation of copending application 07/363,205 filed on Jun. 8, 1989 abandoned.

BACKGROUND OF THE INVENTION

This invention relates to computer-aided design (CAD) systems and in particular to a method and system for modifying the colors of a computer generated graphic image in such a CAD system.

In the field of computer-aided design, there is a need for a method and system for alternatingly applying different colors to a realistic computer generated graphic image without distorting the appearance of the image. With such a method and system, the user could immediately visualize the effect of color changes without requiring that a design be implemented in a three-dimensional object.

The appearance of a three-dimensional object is influenced by the effect of light on the object, which produces various shading of colors of the image such as creating shadows and highlighted areas. In order to faithfully reproduce the appearance of a three-dimensional object in a two-dimensional CAD system, the shading, highlights, reflections and other effects of lighting must be preserved.

Each color in an image may be represented by its (H,S,V) coordinates which represent the Hue, Saturation and Value of the color. Each coordinate may vary between zero and a maximum level. The Hue parameter or coordinate represents the variation between pure colors from red to yellow, to green, to cyan, to blue, to magenta, and finally back to red as its magnitude increases from zero to maximum. The Saturation parameter or coordinate corresponds to the quantity of white pigment in the color, with a decreasing level of S representing the addition of white pigment. The Value parameter or coordinate corresponds to the amount of black pigment added, with a decreasing Value level corresponding to additional black pigment. Additional information regarding the (H,S,V) color system is contained in Foley, J. D., Van Dam, A. "Fundamentals of Interactive Computer Graphics" (pgs. 611-616, Addison-Wesley, 1982), the disclosure of which is hereby incorporated herein by reference.

Colors in a computer-aided design system are represented by Scalar combinations of the combination of red, green and blue primary colors (R,G,B) coordinates. When a two-dimensional image of a three-dimensional object is generated in a CAD system, the shading, highlighting, reflections and other light effects are interpolated in the (R,G,B) coordinates. The darker the area, the smaller the (R,G,B) values and the lighter the area the larger the (R,G,B) values. In such a graphic image in a CAD system, literally hundreds of thousands of distinct (R,G,B) values may be present, distributed throughout the image.

SUMMARY OF THE INVENTION

It is an object of the present invention to provide a method and system for applying a different primary color or blend of primary colors to an image in a manner that does not distort the light effects on the image or otherwise produce undesirable results. This object is met by a method and system for use with a computer-aided design system which determines a color variance between a first, "Original Color" and a second, "New Color," both selected by the user. The color variance is applied to the computer generated graphic image to produce a new graphic image. The "new" color is a substitute color that the user generally desires to appear in the image. Tools are provided to allow the user to select the "original" color directly from the image to be corrected. In this manner, the resulting color variance applied to the image to produce the new graphic image will retain the desired lighting effects of the original image.

In accordance with another aspect of the invention, the Hue coordinate of the first and second colors selected by the user is applied to determine a Hue variance number that is applied to a graphic image in a CAD system to produce a new image. By adjusting the Hue component, the effects of lighting may be faithfully reproduced by keeping the Saturation and Value components constant. Additionally, by applying the Hue variance to every pixel in the image or a portion of the image, a new pixel color may be readily determined while retaining the multitude of color variations within the image.

According to yet another aspect of the invention, it has been determined that the user may occasionally misjudge the effect of applying a "new hue" to an "original hue" with the result that the light effects of the modified image are not what the user anticipates. For example, the resulting image may appear much darker than the original image even though only the hue is adjusted, while the Saturation and Value are kept constant. In order to overcome this difficulty and to make the color modification system and method less prone to user misjudgments, the (H,S,V) coordinates of the first and second colors are used to determine an (H,S,V) coordinate variance. The (H,S,V) variance is added to the (H,S,V) coordinate of each image pixel to arrive at a replacement image pixel. Because the variance number includes Saturation and Value components, the effects of lighting on the image are subject to change when the (H,S,V) variance is added to each image pixel. However, it has been discovered that by selecting the first, or "Original," color from a portion of the image not subject to extensive shadowing or highlighting, the Saturation and Value components of the (H,S,V) variance number will, when added to the (H,S,V) coordinates of each image pixel, provide a very realistic image, having the proper lighting effects.

These and other related objects, advantages and features of this invention will become apparent upon review of the following specification in conjunction with the drawings.

DESCRIPTION OF THE PREFERRED EMBODIMENT

I) Description of the Hardware

Figure 1:
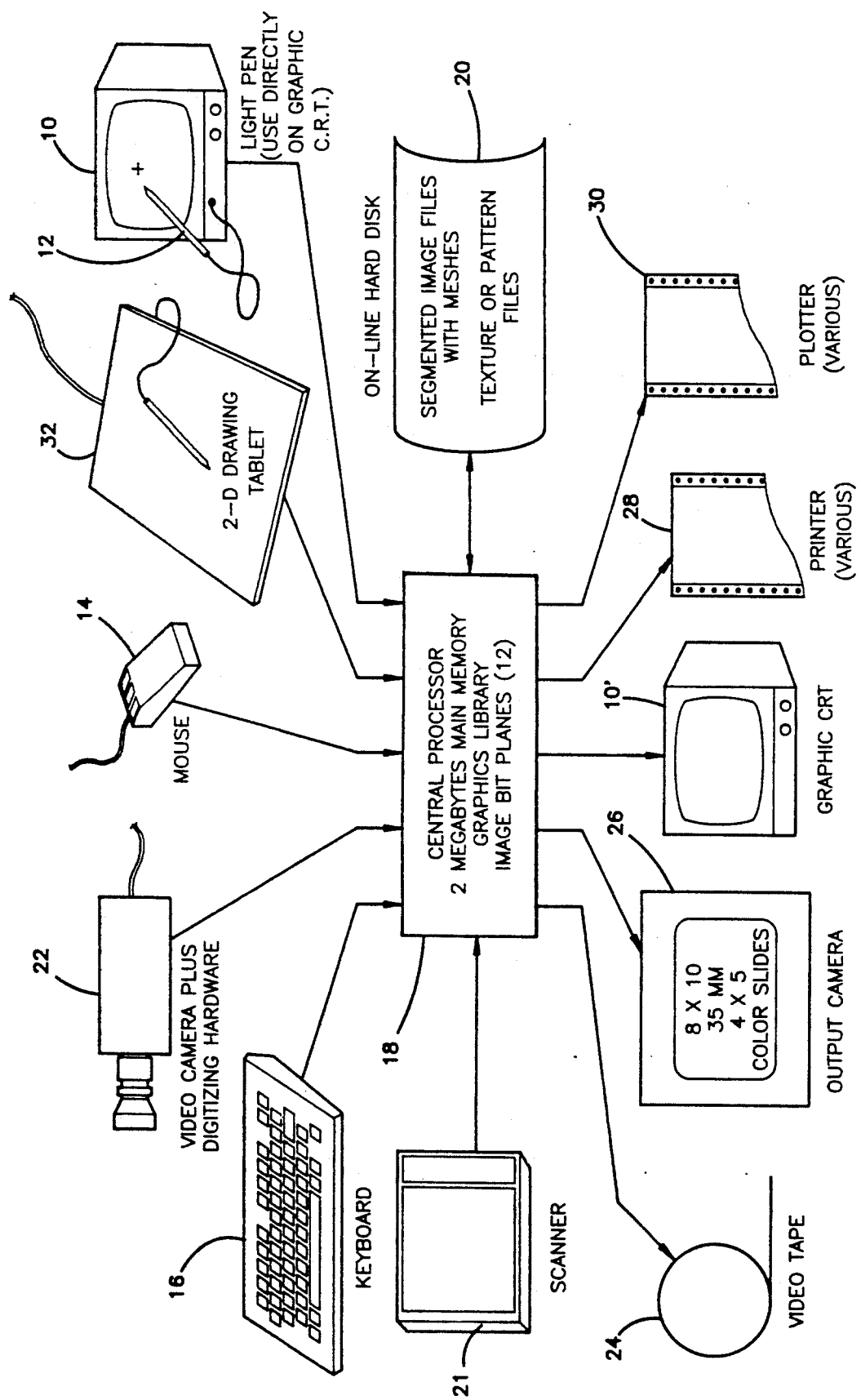
FIG. 1 is an illustration of a CAD hardware system useful in the present invention.

The hardware requirements to support the present invention are basically those needed to support a standard two-dimensional CAD system. An illustration of such a system is given in FIG. 1. The hardware includes a graphic visual input/output device such as a CRT 10 or 10', with a standard light pen 12 or mouse 14 as a locating instrument, a keyboard 16, a central processing unit 18 that will support program control of the individual pixels displayed on the graphic CRT 10 or 10' through use of a graphics command library, and a data storage unit 20, preferably a hard disk storage unit. If the images used in the system are to be input through a video input, a video camera 22 and standard associated frame capture hardware (not shown) are also required. For input of printed images, scanner 21 is provided. Images can also be inputted with a standard two-dimensional digitizing drawing device 32. Data storage unit 20 is needed for storage of the data files supporting the two-dimensional software system, including the digital graphic images. Another consideration is the number of simultaneously displayable colors possible on the graphic CRT 10 or 10' of the computer system; a minimum of 256 simultaneously displayable colors is required. Adequate facilities can be found in the Engineering Workstations currently available from several venders such as Silicon Graphics Inc., Apple Computer Inc., and SUN Microsystems.

The present invention is preferably carried out with a Silicon Graphics Inc. IRIS workstation with a three-button mouse and a graphic CRT having a viewable resolution of 768 by 1024 pixels, a central processor having 2 megabytes of main memory and a 170 megabyte hard disk for supporting 16 million simultaneously displayable colors on the graphic CRT.

The output of the system can be directed in known manner to a video tape recorder 24, an output camera 26 capable of producing color slides or photographs of various sizes, a hard-copy printer 28, or a plotter 30.

II) Description of the Software

In describing the functions of the present invention for changing or modifying the color of graphic images, two groups of functions are detailed. The first is a set of functions for segmenting an image displayed on a graphic CRT 10'. The second is a set of functions for applying a new color to the segmented image. Since most current CAD systems are menu-driven, the explanation below will describe how the user would execute the functions by selecting from a menu displayed on the CRT of the system.

The functions for segmenting an image may be provided in a menu with the following choices:

| Create Segment |
| --- |
| Edit Segment |
| Store Segment |

The "Create Segment" functions permit the user to digitize the (X,Y) coordinates of straight or curved lines (polylines or polysplines) to divide the image into segments. The user may create as many segments as desired to cover the image. If the user is not satisfied with the shapes of the created segments, the "Edit Segment" functions may be selected from the menu to modify the shape of the segments. With this function, the user can use a locating instrument to move, insert or delete points in a segment to modify its shape. Once the user is satisfied with the image segments, the segments can be stored with the associated image by selection of the "Store Segment" function.

The functions for applying new colors to a segmented image may be provided in a menu with the following choices:

| Specify New Color |
| --- |
| Apply New Color |

The "Specify New Color" function allows the user to specify the color to be applied to the Segmented Image displayed on the graphic CRT. When this function is selected, the user may select a color from a pre-stored color palette or create a new color by selecting (R,G,B) or (H,S,V) coordinates of a desired color. Once the new color is selected, the user may select the "Apply New Color" function to apply the new color to each desired segment of the image. After this function is selected, the user is prompted to digitize a location on the image having the color selected by the user to represent the "Original Color" of the image. The Original Color is most appropriately selected from a portion of the image free from distortion by reflection, shading or other lighting effects. After the user selects, with the locating instrument, the image segments to be modified, this function will apply the new color to the selected segments one-by-one, modifying each pixel's (R,G,B) coordinates according to the relationship between the "New Color" and the "Original Color" selected.

III) Detailed Description of the Software

Figure 2:
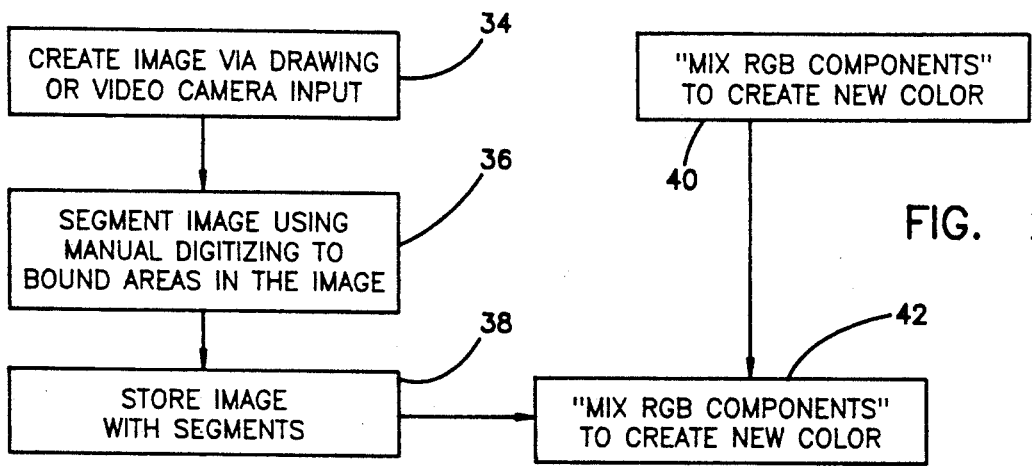
FIG. 2 is a flow chart illustrating a portion of the CAD system according to the present invention.

Referring to FIG. 2, a portion of a two-dimensional CAD system embodying the present invention is illustrated. The illustrated functions are invoked from the exits to a standard two-dimensional computer-aided design system software. The present invention may be used with such standard two-dimensional CAD software, and the other details of such software are not pertinent to, or necessary for, a full understanding of the present invention.

As an initial function, a realistic image is created (34) using a "Paint Program," which is a standard feature of many two-dimensional CAD systems, or may be entered into the system with a video camera 22 and associated standard hardware for digitizing images to be interfaced with the computer system. In either case, the result will be a rectangular array of pixels making up the image displayed on the graphic CRT 10 of the system, which may be stored to and retrieved from the data storage unit 20. Once an image is created, the user employs a manual digitizing process to separate (36) image into different distinct areas making up the image. These newly-created segments are then stored (38) with the image in data storage unit 20 for further retrieval.

Once an image of interest and its segments are created and stored, the user may select (40) the new color to be subsequently applied to the image. This may be accomplished by selecting a color from a pre-stored color palette or by selecting the (R,G,B) or (H,S,V) coordinates of a desired color in a known manner. Once the image of interest and segments are created and stored and a new color to be applied is developed, the new color is applied (42) to selected image segments. In the following sections, a detailed description of the software for implementing functions (36) and (42) are provided. The remaining functions (34), (38) and (40) are common features in a two-dimensional CAD system and the detailed description thereof is not necessary for a full understanding of the invention.

Figure 3:
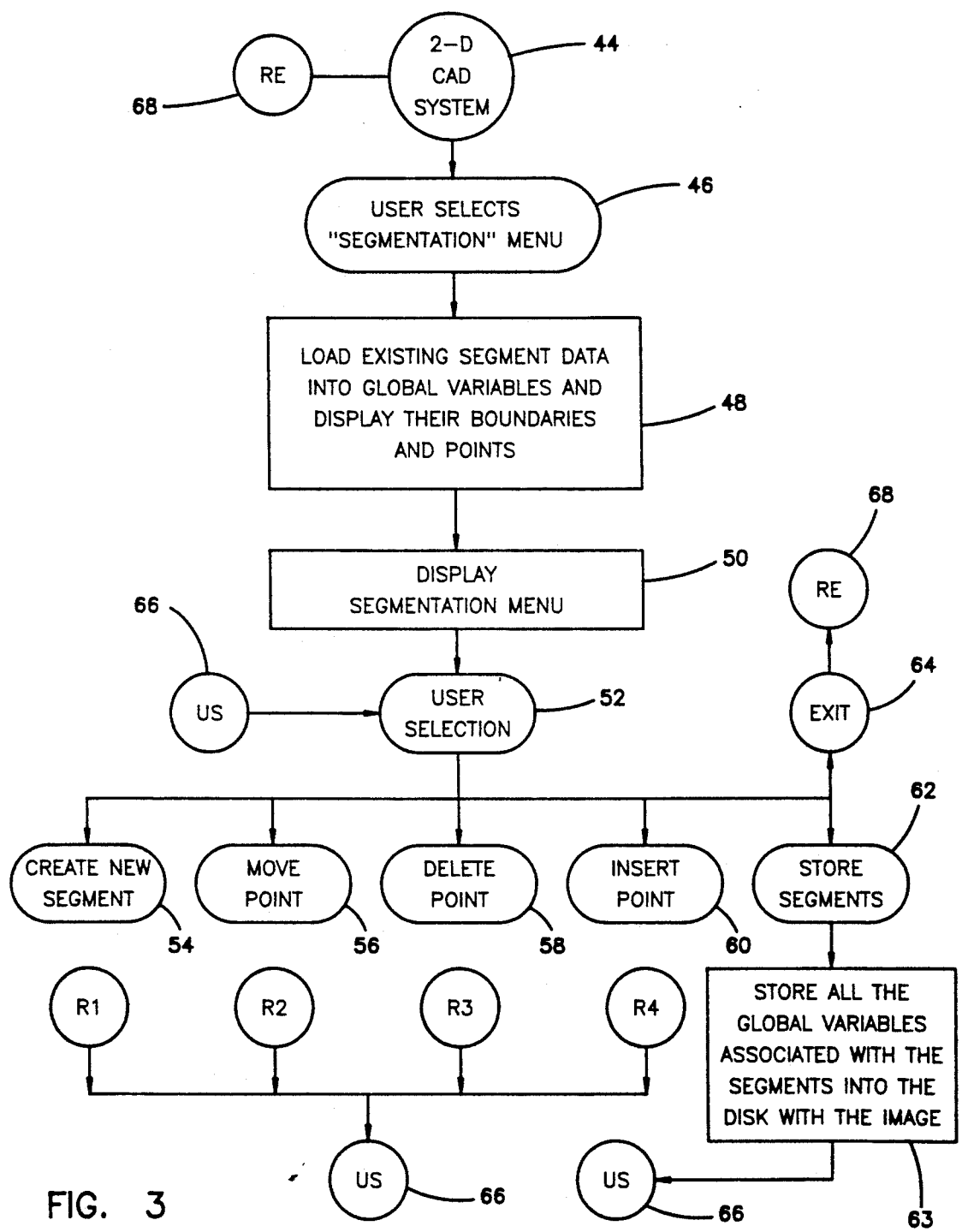
FIG. 3 is a flow chart illustrating the image segmentation functions of the present invention.

FIG. 3 illustrates the main flow chart of the function that provides tools for the user to divide an image displayed on graphic CRT 10 into segments. When the "Segmentation" function is invoked from the two-dimensional CAD system (44, 46) the system retrieves (48) existing segment data, if any, from the storage unit 20 and stores the data in global variables. Any existing lines defining segment boundaries are displayed superimposed on the image. The system then displays a menu for the user to select (50, 52) individual subfunctions (54) through (62) associated with the segmentation function. Once each of these subfunctions (54) through (62) finishes its task, control is returned to the segmentation function illustrated in FIG. 3 indicated by the labels R1 through R4. Control is then passed back to the menu selection (66) so that the user may proceed to the next function. When the "Exit" function is selected, this function terminates and control passes back to the 2-D CAD system (68, 44).

Figure 4:
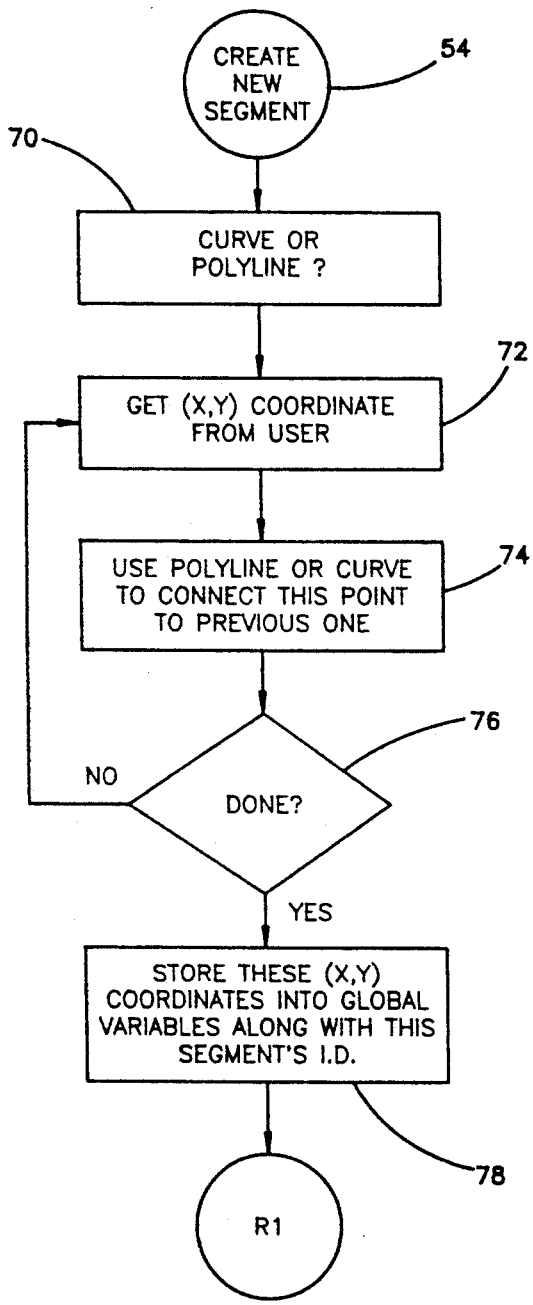
FIG. 4 is a flow chart illustrating the create new segment function of the present invention.
Figure 5:
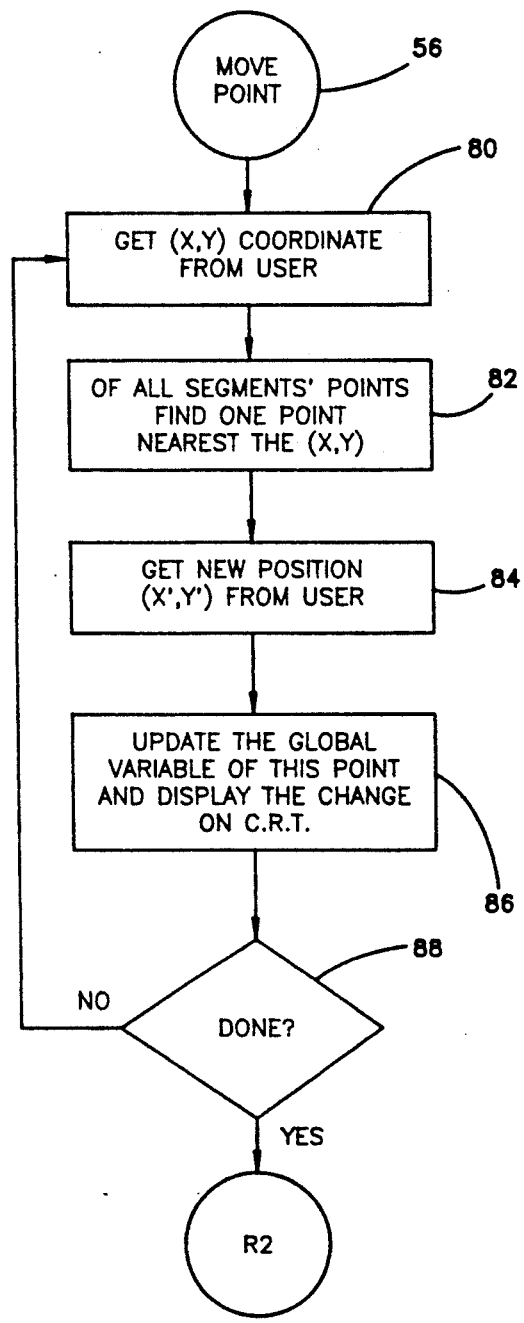
FIG. 5 is a flow chart illustrating the move point function of the present invention.
Figure 6:
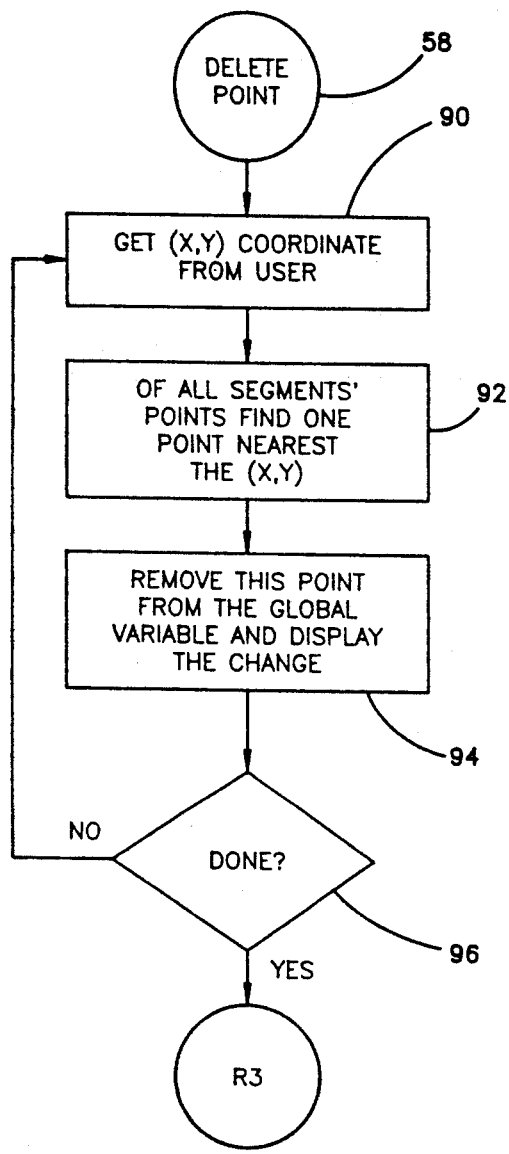
FIG. 6 is a flow chart illustrating the delete point function of the present invention.
Figure 7:
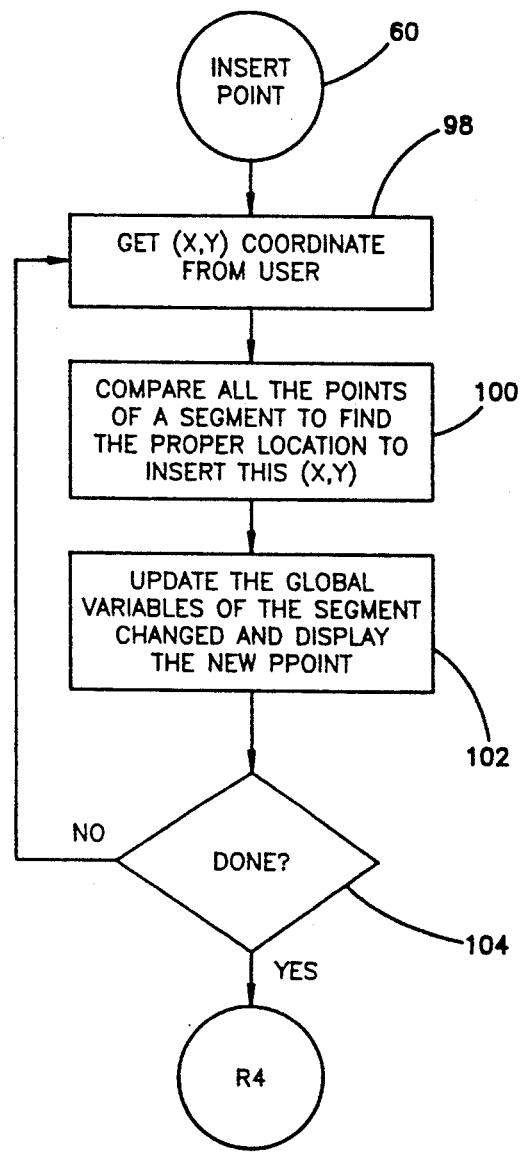
FIG. 7 is a flow chart illustrating the insert point function of the present invention.

The "Create New Segment" subfunction (54), illustrated in FIG. 4, requires the user to choose (70) whether the new line is to be a curved "polyspline" or a straight "polyline." The user is required to digitize (72) points of interest using a locating instrument such as mouse 14. The system connects (74) the digitized points with polylines or polysplines. When the image area of interest is completely bounded by the segments, and the shape of the segments is satisfactory, the user may terminate (76) the subfunction. The system then stores (78) the digitized coordinates in global variables.

To modify the shape of an existing segment, the "Move Point" (56), "Delete Point" (58) or "Insert Point" (60) subfunctions may be selected. All three subfunctions require the user to digitize (80, 90, 98) an (X,Y) coordinate using a locating instrument such as mouse 14. The system then determines (82, 92, 100), by comparing the digitized coordinate with all of the data points making up the existing segments stored in the global variables, which point of which segment is to be moved or deleted or the proper location to insert a new point. For the move point function (56) the user must also digitize (84) a new location for the point. The global variables assigned to the segment of interest are then updated (86, 94, 102). When the user indicates that no additional points are to be moved, deleted or inserted (88, 96, 104) control is passed back to the calling program. After the desired segments are created and modified, the "Store Segments" function (62) is selected (FIG. 3) and the system stores all the segment data from the global variables with the image of interest in the storage unit 20 for further retrieval.

Figure 8:
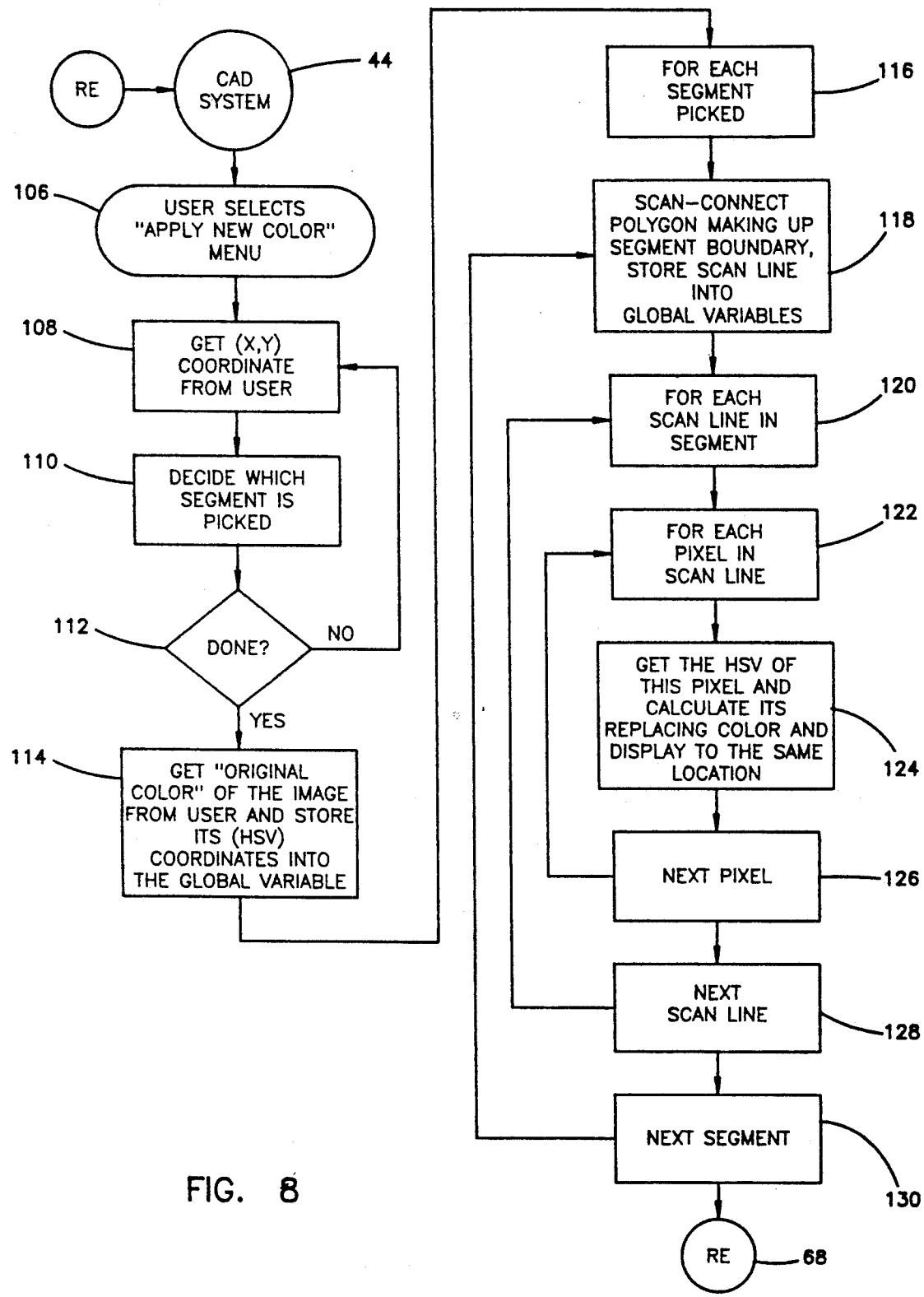
FIG. 8 is a flow chart illustrating the new color application functions of the present invention.

FIG. 8 illustrates the flow chart for a function that applies a "New Color" created at (40) to a segmented image. With a segmented image of interest displayed on the graphic CRT 10 and a "New Color" stored in a global variable, the "Apply New Color" function is invoked from the 2-D CAD system (44, 106). The system prompts the user to select (108, 110) segments of the current image to which the new color is to be applied. This is accomplished by comparing the (X,Y) coordinates selected by the user with the segment data stored in the global variables to determine which segment contains the selected coordinates. The user may continue to select segments until an indication is made (112) to the system that all desired segments are selected.

The system then prompts the user to select (114) the "Original Color" from the image by digitizing a point on the image with a locating instrument. The system converts the (R,G,B) coordinates of the point selected by the user to (H,S,V) coordinates and stores these coordinates in a global variable. For each segment selected (116) by the user, the system scan-converts (118) the polygon defining the boundaries of the segment and stores the (R,G,B) coordinates of each pixel in global variables. The system then scans (120) each line and, for each pixel in the line, the system converts the (R,G,B) coordinates to (H,S,V) coordinates and calculates (122, 124) the (H,S,V) coordinates of a replacement pixel having the new color applied. The (H,S,V) coordinates of the replacement pixel is converted to (R,G,B) coordinates and applied to the image and the next pixel is replaced (126, 122). After all lines (128, 120) and all segments (130, 116) have been processed, the control returns to the 2-D CAD system (68, 44).

In order to realistically replace the color of an image while retaining the effects of light due to shading, reflection and the like, the present system requires the user to select an "Original Color" on the image which represents a baseline color that is representative of the image. As such, the portion of the image selected by the user as the "Original Color" should not be deeply shaded or present a high degree of light reflection. If (nH, nS, nV) represents the "New Color" to be applied and (oH, oS, oV) is the "Original Color" selected by the user, then the replacing color (rH, rS, rV) for any color (iH, iS, iV) is obtained according to the following:

rH = iH + nH − oH = iH + H variance
rS = iS + nS − oS = iS + S variance
rV = iV + nV − oV = iV + V variance In the illustrated embodiment, the Hue, or H coordinate, of each pixel is modified according to the variance between the Hue of the "New Color" and that of the "Original Color." Additionally, the Saturation and Value coordinates are modified according to the variance between the corresponding coordinates in the "New Color" and the "Original Color." Although the Saturation and Value coordinates will be changed from the original image to the modified image, the contrast or gradient in Saturation and Value coordinates from pixel to pixel will remain the same and the light effects in the color-modified image are more likely to appear as intended by the user when selecting the "New Color" to apply to the image. Because the "Original Color" is properly selected from a portion of the image which is not subject to extreme effects from lighting, i.e., is not heavily shaded or heavily reflecting, this "Baseline" shading represented in the Saturation and Value coordinates of the "Original Color" will be reflected in the Saturation and Value variance numbers which will be added to the (H,S,V) coordinates of each pixel to produce the replacement color. In this manner, the baseline lighting of the image, as well as the lighting effects of the various portions of the image, will be preserved in the replacement image.

Figure 9:
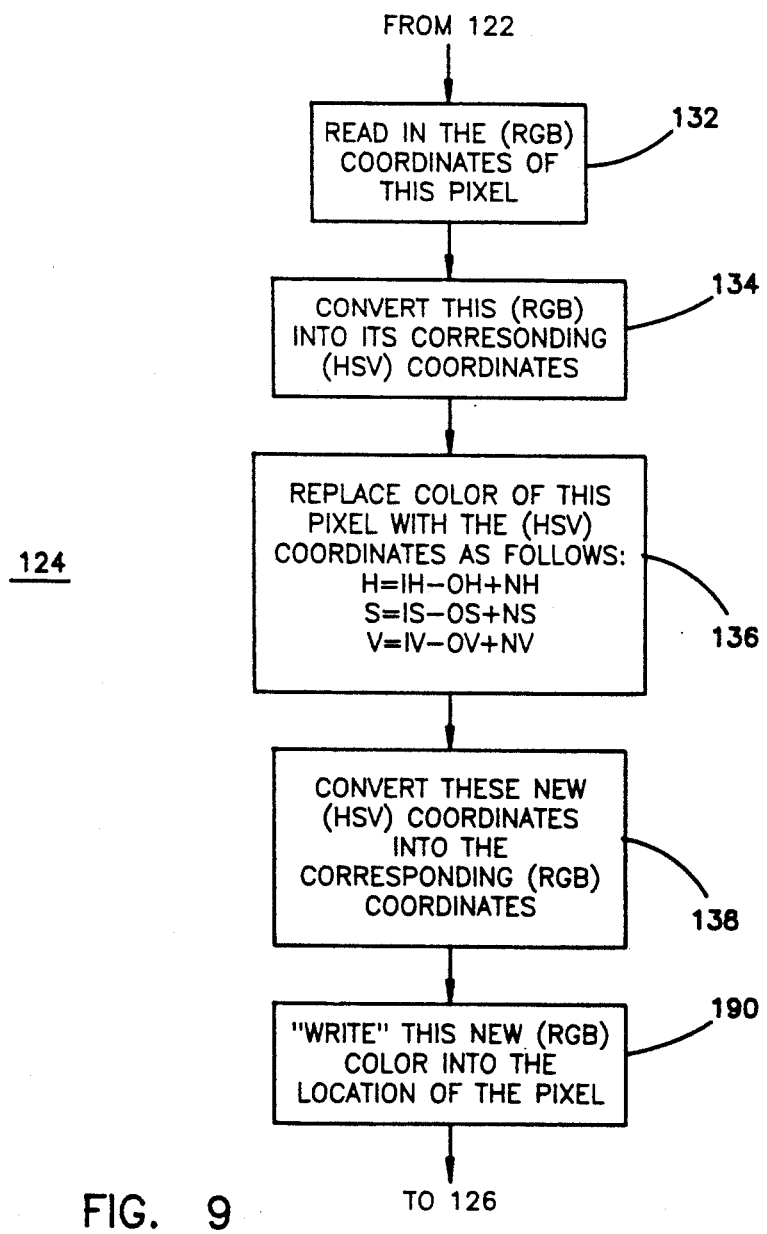
FIG. 9 is a flow chart illustrating the color replacement function of the present invention.

In the illustrated embodiment, the calculation of each replacement pixel is illustrated in FIG. 9. The (R,G,B) coordinates are converted to (H,S,V) coordinates (132, 134) and a replacement color for the pixel is calculated (136) using the above equations. The replacement color is then reconverted to (R,G,B) to replace the parameters of the pixel at that location.

Changes and modifications in the specifically described embodiments can be carried out without departing from the principles of the invention which is intended to be limited only by the scope of the appended claims, as interpreted according to the principles of patient law including the doctrine of equivalents.

The embodiments of the invention in which an exclusive property or privilege is claimed are defined as follows:

1. In a computer-aided design system, a method for modifying the color of computer generated continuous-color graphic images including the steps of:
    selecting a first color by receiving a user selection of a location on a computer generated continuous-color graphic image from a locating instrument and determining color coordinates at said location;
    selecting a second color to be applied to at least part of said computer generated continuous-color graphic image, said second color having color coordinates that are different from the color coordinates at said location; and
    modifying the color coordinates of said part of said computer generated graphic image as a function of the mathematical difference between the color coordinates at said location and the color coordinate of said second color to produce a new graphic image.

2. The method for modifying the color of computer generated continuous-color graphic images in claim 1 in which said step of selecting a second color includes receiving a user selection of another location on said computer generated continuous-color image from said locating instrument and determining color coordinates at said another location.

3. The method for modifying the color of computer generated continuous-color graphic images in claim 1 further including the steps of:
    dividing a computer generated continuous-color graphic image into segments, each segment representing a portion of a three-dimensional object; and
    receiving said user selection from a locating instrument of which of said segments said step of modifying is to be applied.

4. The method for modifying the color of computer generated continuous-color graphic images in claim 1 in which said step of modifying the color coordinates includes converting said color coordinates at said location to (H,S,V) coordinates.

5. In a computer-aided design system, a method for modifying the color of computer generated continuous-color graphic images including the steps of:
    selecting a first color by receiving a user selection of a location on a computer generated continuous-color graphic image from a locating instrument and determining color coordinates as said location, one of said coordinates being hue;
    selecting a second color to be applied to at least part of said computer generated continuous-color graphic image, said second color having color coordinates including hue, wherein said hue that is a coordinate of said second color is different from the hue at said location;
    determining the mathematical difference between said hue coordinate at said location and said hue that is a coordinate of said second color; and
    modifying at least a part of said computer generated continuous-color graphic image as a function of said mathematical difference between said hue coordinate at said location and said hue that is a coordinate of said second color to produce a new computer generated continuous-color graphic image.

6. The method for modifying the color of computer generated continuous-color graphic images in claim 5 in which said step of selecting a second color includes receiving a user selection of another location on said computer generated continuous-color image from said locating instrument and determining the hue coordinate at said another location.

7. The method for modifying the color of computer generated continuous-color graphic images in claim 5 further including the steps of:
    dividing said computer generated continuous-color image into segments, each segment representing a portion of a three-dimensional object; and
    receiving a user selection of which of said segments said step of modifying is to be applied.

8. The method for modifying the color of computer generated continuous-color graphic images in claim 7 in which said step of modifying includes individually examining each pixel in each segment selected by the user, determining the hue coordinate of each examined pixel, adding said mathematical difference between said hue coordinate at said location and said hue that is a coordinate of said second color to said hue coordinate of each examined pixel to obtain a new hue coordinate, and replacing said examined pixel with a new pixel having said new hue coordinate.

9. The method for modifying the color of computer generated continuous-color graphic images in claim 8 in which said individually examining each pixel in each segment includes scan-converting portions of said computer generated continuous-color image corresponding to the segments selected by the user.

10. The method for modifying the color of computer generated continuous-color graphic images in claim 5 in which said step of determining said mathematical difference between said hue coordinate at said location and said hue that is a coordinate of said second color includes determining the (H,S,V) coordinates at said location and the (H,S,V) coordinates of said second color.

11. In a computer-aided design system, a method for modifying the color of computer generated continuous-color graphic images including the steps of:
    selecting a first color having (H,S,V) coordinates by receiving a user selection at a location on a computer generated continuous-color graphic image from a locating instrument and determining color coordinates at said location;
    selecting a second color to be applied to at least part of said computer generated continuous-color graphic image, said second color having (H,S,V) coordinates that are different from those at said location;
    determining the mathematical difference between said (H,S,V) coordinates at said location and said (H,S,V) coordinates of said second color; and modifying the (H,S,V) coordinates of said part of said computer generated continuous-color graphic image as a function of said mathematical difference between said (H,S,V) coordinates at said location and said (H,S,V) coordinates of said second color to produce a new graphic image.

12. The method for modifying the color of computer generated continuous-color graphic images in claim 11 in which said step of selecting a second color includes receiving a user selection of another location on said computer generated continuous-color graphic image from said locating instrument and determining the (H,S,V) coordinates at said another location.

13. The method for modifying the color of computer generated continuous-color graphic images in claim 11 further including the steps of:
dividing a computer generated continuous-color graphic image into segments, each segment representing a portion of a three-dimensional object; and
receiving a user selection from a locating instrument of which of said segments said step of modifying is to be applied.

14. The method for modifying the color of computer generated continuous-color graphic images in claim 12 in which said step of modifying includes individually examining each pixel in each segment selected by the user, determining the (H,S,V) coordinates of each examined pixel, adding said mathematical difference between said (H,S,V) coordinates at said location and said (H,S,V) coordinates of said second color to said (H,S,V) coordinates to each examined pixel to obtain a new value of (H,S,V) coordinates and replacing said examined pixel with a new pixel having said new (H,S,V) coordinates.

15. The method for modifying the color of computer generated continuous-color graphic images in claim 14 in which said individually examining each pixel in each segment includes scan-converting portions of said computer generated continuous-color graphic image corresponding to the segments selected by the user.

16. In a computer-aided design system, a method for modifying the color of computer generated continuous-color graphic images including the steps of:
(a) selecting a first color having (H,S,V) coordinates by receiving a user selection of a location on a computer generated continuous-color graphic image from a locating instrument and determining (H,S,V) coordinates at said location;
(b) selecting a second color to be applied to at least part of said computer generated continuous-color graphic image, said second color having (H,S,V) coordinates different from those at said location;
(c) determining the mathematical difference in (H,S,V) coordinates between said (H,S,V) coordinates at said location and said (H,S,V) coordinates of said second color;
(d) examining a pixel in a computer generated continuous-color graphic image and determining the (H,S,V) coordinates of said pixel;
(e) summing said mathematical difference in (H,S,V) coordinates between said (H,S,V) coordinates at said location and said (H,S,V) coordinates of said second color with said (H,S,V) coordinates of the examined pixel to obtain new (H,S,V) coordinates;
(f) replacing the examined pixel with a new pixel having said new (H,S,V) coordinates; and
(g) repeating steps (d)–(f) for all pixels in at least a portion of said computer generated continuous-color graphic image.

17. The method for modifying the color of computer generated continuous-color graphic images in claim 16 in which said step of selecting a second color includes receiving a user selection of another location on a computer generated continuous-color graphic image from said locating instrument and determining the (H,S,V) coordinates at said another location.

18. The method for modifying the color of computer generated continuous-color graphic images in claim 16 further including the steps of:
dividing said computer generated continuous-color graphic image into segments, each segment representing a portion of a three-dimensional object; and
receiving a user selection of which of said segments said steps (d)–(g) are to be applied.

19. The method for modifying the color of computer generated continuous-color graphic images in claim 16 in which step (d) includes scan-converting said computer generated continuous-color graphic image.

20. The method for modifying the color of computer generated continuous-color graphic images in claim 16 in which said step (c) includes converting color coordinates at said location to (H,S,V) coordinates.

21. A system for modifying the colors of computer generated continuous-color graphic images in a computer-aided design system comprising:
first selecting means for receiving a user selection of a location on a computer generated continuous-color graphic image to be defined as a first color and for determining the hue at said location;
second selecting means for receiving a user selection of a second color to be applied to at least a portion of said computer generated continuous-color graphic image, said second color having a hue that is different from the hue at said location, and means for determining the hue of said second color;
first determining means responsive to said first and second selecting means for determining a variance number that is a function of the mathematical difference between said hue at said location and said hue of said second color;
means for scan-converting said computer generated continuous-color graphic image in said design system;
second determining means responsive to said scan-converting means for determining color coordinates of a pixel;
calculating means responsive to said color coordinates and said variance number for calculating replacement color coordinates of a pixel as a function of the sum of the color coordinates of the pixel and the variance number; and
means responsive to the replacement color coordinates of a pixel for replacing the color coordinates of the corresponding pixel in the computer generated continuous-color graphic image.

22. The system in claim 21 in which said second selecting means includes means for receiving a user selection of another location on a computer generated continuous-color graphic image from a locating instrument and for determining the hue at said another location.

23. The system in claim 21 further including means for dividing a computer generated continuous-color graphic image into segments, such that each of said segments represents a portion of a three-dimensional object, and further including means for receiving a user selection of segments and for applying said scan-converting means to selected ones of said segments.

24. The system in claim 21 in which:
   said first selecting means includes means for determining the (H,S,V) coordinates at said location;
   said second selecting means includes means for determining the (H,S,V) coordinates of said second color;
   said first determining means includes means for determining a set of variance numbers that is a function of the mathematical difference between (H,S,V) coordinates at said location and said (H,S,V) coordinates of said second color; and
   said calculating means includes means responsive to the (H,S,V) coordinates of a pixel and said set of variance numbers for calculating replacement (H,S,V) coordinates of a pixel as a function of the sum of the (H,S,V) coordinate of the pixel and the set of variance numbers.

* * * * *

UNITED STATES PATENT AND TRADEMARK OFFICE
CERTIFICATE OF CORRECTION

PATENT NO. : 5,222,206
DATED : June 22, 1993
INVENTOR(S) : Ho-Long Liao

It is certified that error appears in the above-indentified patent and that said Letters Patent is hereby corrected as shown below:

Column 7, line 13, "patient" should be --patent--.

Column 9, line 25, "claim 12" should be --claim 13--.

Signed and Sealed this

Twelfth Day of July, 1994

Attest:

BRUCE LEHMAN

Attesting Officer       Commissioner of Patents and Trademarks